US008443373B2

(12) United States Patent
Fernandes et al.

(10) Patent No.: US 8,443,373 B2
(45) Date of Patent: May 14, 2013

(54) EFFICIENT UTILIZATION OF IDLE RESOURCES IN A RESOURCE MANAGER

(75) Inventors: Genevieve Fernandes, Redmond, WA (US); Marko Radmilac, Bellevue, WA (US); Donald James McCrady, Redmond, WA (US); Krishnan Varadarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 12/694,084

(22) Filed: Jan. 26, 2010

(65) Prior Publication Data

US 2011/0185364 A1    Jul. 28, 2011

(51) Int. Cl.
G06F 9/46 (2006.01)
G06F 15/173 (2006.01)

(52) U.S. Cl.
USPC ............................ 718/105; 718/104; 709/226

(58) Field of Classification Search .............. 718/1–105; 709/201–203, 213–216, 223–229
See application file for complete search history.

(56) References Cited

U.S. PATENT DOCUMENTS

| | | | | |
|---|---|---|---|---|
| 5,291,599 | A * | 3/1994 | Cohen et al. | 718/102 |
| 6,915,516 | B1 | 7/2005 | Glidewell | |
| 7,290,260 | B2 * | 10/2007 | Miller | 718/104 |
| 7,444,635 | B2 | 10/2008 | Lehtinen | |
| 7,451,073 | B2 | 11/2008 | Tormey | |
| 7,565,656 | B2 | 7/2009 | Yamasaki | |
| 7,581,224 | B2 | 8/2009 | Romero | |
| 7,587,718 | B1 | 9/2009 | Mincarelli | |
| 7,600,229 | B1 | 10/2009 | Shmuylovich | |
| 8,255,915 | B1 * | 8/2012 | Blanding et al. | 718/104 |
| 2003/0158884 | A1 * | 8/2003 | Alford, Jr. | 709/104 |
| 2005/0091365 | A1 * | 4/2005 | Lowell et al. | 709/224 |
| 2005/0246216 | A1 * | 11/2005 | Rosen et al. | 705/8 |
| 2005/0257020 | A1 * | 11/2005 | Kashyap et al. | 711/170 |
| 2006/0206891 | A1 * | 9/2006 | Armstrong et al. | 718/1 |
| 2008/0155100 | A1 * | 6/2008 | Ahmed et al. | 709/226 |
| 2008/0184253 | A1 * | 7/2008 | Kashyap | 718/104 |
| 2009/0055507 | A1 * | 2/2009 | Oeda | 709/216 |
| 2009/0265450 | A1 * | 10/2009 | Helmer et al. | 709/221 |
| 2009/0307432 | A1 * | 12/2009 | Fleming | 711/135 |
| 2010/0005473 | A1 * | 1/2010 | Blanding et al. | 718/104 |
| 2010/0241751 | A1 * | 9/2010 | Sonoda et al. | 709/226 |
| 2012/0110592 | A1 * | 5/2012 | Shah et al. | 718/104 |

OTHER PUBLICATIONS

Ben Verghese; Performance Isolation and Resource Sharing on Shared-Memory Multiprocessors; Computer Systems Laboratory Department of Electrical Engineering and Computer Science Stanford University; Jul. 1997; 27 pages.*

Derek Wright; Cheap Cycles from the Desktop to the Dedicated Cluster: Combining Opportunistic and Dedicated Scheduling with Condor—Published Date: 2001 citeseerx.ist.psu.edu/viewdoc/download?doi=10.1.1.29.2795&rep=rep1&type=pdf.

A. Lenica; Agent-based Grid Resource Management—Published Date: 2006 citeseerx.ist.psu.edu/viewdoc/download?doi=10.1.1.76.6375&rep=rep1&type=pdf.

Dawson R. Engler; Exokernel: An Operating System Architecture for Application-Level Resource Management—Published Date: 1995 pdos.csail.mit.edu/6.828/2008/readings/engler95exokernel.pdf.

* cited by examiner

Primary Examiner — Abdullah Al Kawsar
(74) Attorney, Agent, or Firm — Workman Nydegger

(57) ABSTRACT

Embodiments are directed to dynamically allocating processing resources among a plurality of resource schedulers. A resource manager dynamically allocates resources to a first resource scheduler. The resource manager is configured to dynamically allocate resources among a plurality of resource schedulers, and each scheduler is configured to manage various processing resources. The resource manager determines that at least one of the processing resources dynamically allocated to the first resource scheduler is idle. The resource manager determines that at least one other resource scheduler needs additional processing resources and, based on the determination, loans the determined idle processing resource of the first resource scheduler to a second resource scheduler.

20 Claims, 4 Drawing Sheets

EFFICIENT UTILIZATION OF IDLE RESOURCES IN A RESOURCE MANAGER

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. Some software applications may be designed to perform these or other tasks in parallel. Computer systems that process such applications typically include processors with multiple cores and/or multiple hardware threads. Each of the cores or threads is capable of processing tasks independent of and simultaneously with other cores or threads. In some cases, parallel processing systems may incorporate many processors with a large number of processing cores or threads. In such cases, resources managers are typically used to allocate processing time among these processing resources.

BRIEF SUMMARY

Embodiments described herein are directed to dynamically allocating processing resources among a plurality of resource schedulers. In one embodiment, a resource manager dynamically allocates resources to a first resource scheduler. The resource manager is configured to dynamically allocate resources among a plurality of resource schedulers, and each scheduler is configured to manage various processing resources. The resource manager determines that at least one of the processing resources dynamically allocated to the first resource scheduler is idle. The resource manager determines that at least one other resource scheduler needs additional processing resources and, based on the determination, loans the determined idle processing resource of the first resource scheduler to a second resource scheduler.

In another embodiment, a computer system determines that processing resources of a first resource scheduler have been loaned by a resource manager to at least a second resource scheduler. The resource manager receives usage data inputs indicating how the processing resources of the first resource scheduler and of the second resource scheduler are being used. The resource manager determines that, based on the usage data inputs, the loaned resources are to be rebalanced, so that at least one of the first resource scheduler's loaned resources is to become part of the plurality of resources managed by the second resource scheduler (and thus taken away from the first scheduler). The resource manager also dynamically rebalances the allocation of resources between the first and second resource schedulers, so that at least one of the first resource scheduler's loaned resources becomes part of the plurality of resources managed by the second resource scheduler.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
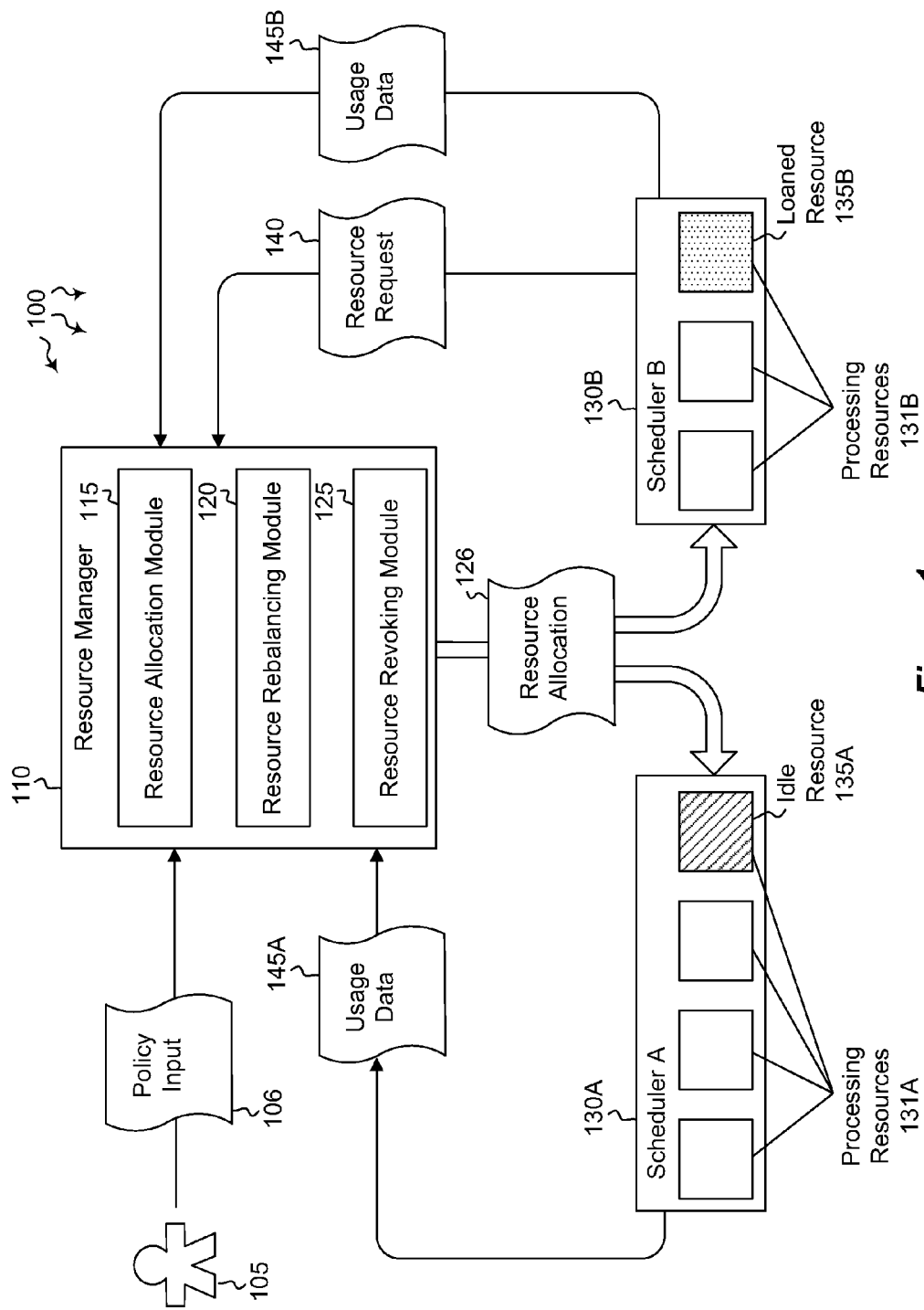
FIG. 1 illustrates a computer architecture in which embodiments of the present invention may operate including dynamically allocating processing resources among a plurality of resource schedulers.

Embodiments described herein are directed to dynamically allocating processing resources among a plurality of resource schedulers. In one embodiment, a resource manager dynamically allocates resources to a first resource scheduler. The resource manager is configured to dynamically allocate resources among a plurality of resource schedulers, and each scheduler is configured to manage various processing resources. The resource manager determines that at least one of the processing resources dynamically allocated to the first resource scheduler is idle. The resource manager determines that at least one other resource scheduler needs additional processing resources and, based on the determination, loans the determined idle processing resource of the first resource scheduler to a second resource scheduler.

In another embodiment, a computer system determines that processing resources of a first resource scheduler have been loaned by a resource manager to at least a second resource scheduler. The resource manager receives usage data inputs indicating how the processing resources of the first resource scheduler and of the second resource scheduler are being used. The resource manager determines that, based on the usage data inputs, the loaned resources are to be rebalanced, so that at least one of the first resource scheduler's loaned resources is to become part of the plurality of resources managed by the second resource scheduler. The resource manager also dynamically rebalances the allocation of resources between the first and second resource schedulers, so that at least one of the first resource scheduler's loaned resources becomes part of the plurality of resources managed by the second resource scheduler.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer program products, computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes resource manager 110. Resource manager, as the term is used herein, refers to a computing module that is configured to manage multiple different processing resources. Resource manager 110 may be configured to allocate processing resources (or simply "resources") among various schedulers, rebalance those resources and remove or revoke resource assignments. As used herein, processing resources may be any type of processing module including a processor, processor core, multi-processor system or any other type of processing resource.

In some cases, schedulers may be used to schedule processing tasks and processing time between different processing resources. In one example, a scheduler may schedule processing time between different cores of the same processor. For instance, scheduler A (130A) may be configured to schedule tasks and/or processing time for processing resources 131A. Thus, in some cases, resource manager 110 may allocate processing resources 131A to scheduler 130A, and scheduler 130A may then schedule tasks/processing time for those allocated resources. This resource allocation 126 may be received from resource manager 110 at any point in time and may be received periodically at a predefined interval or may be received whenever the resource manger has determined that a change should be made to the processing resources.

Accordingly, as resources are assigned by the resource manager to various schedulers (although only two are shown (130A and 130B), any number of schedulers may be implemented), the schedulers may be configured to provide processing feedback in the form of usage data 145A/145B. This usage data may indicate various measurements that would be helpful to the resource manager such as each resource's processing and idle time, each resource's pending and completed tasks, each resource's used capacity and total capacity as well as a predicted usage based on past usage. Many other types of usage information may also be passed from the scheduler(s) to the resource manager.

The resource manager may then use the usage data to determine whether resources are to be allocated in a different manner, rebalanced, revoked or otherwise changed. For instance, usage data 145A may indicate that resource 135A of scheduler A is idle. Idle resource 135A may then be loaned out to another scheduler. This loaned resource 135B may then be used by scheduler B to process tasks assigned to that scheduler. It should be noted that idle resource 135A and loaned resource 135B are the same computing resource and are controlled (at least for some period of time) by both scheduler A and by scheduler B. Accordingly, because the resource 135A/135B is controlled by both schedulers, the loaned resource may be immediately revoked by the loaning scheduler to process the loaning scheduler's tasks. Usage data 145B will then indicate the usage data of processing resources 131B including the loaned resource 135B. The allocation of resources, including the loaning of processing resources to other schedulers, will be discussed in greater detail below with regard to method 200 of FIG. 2.

Figure 2:
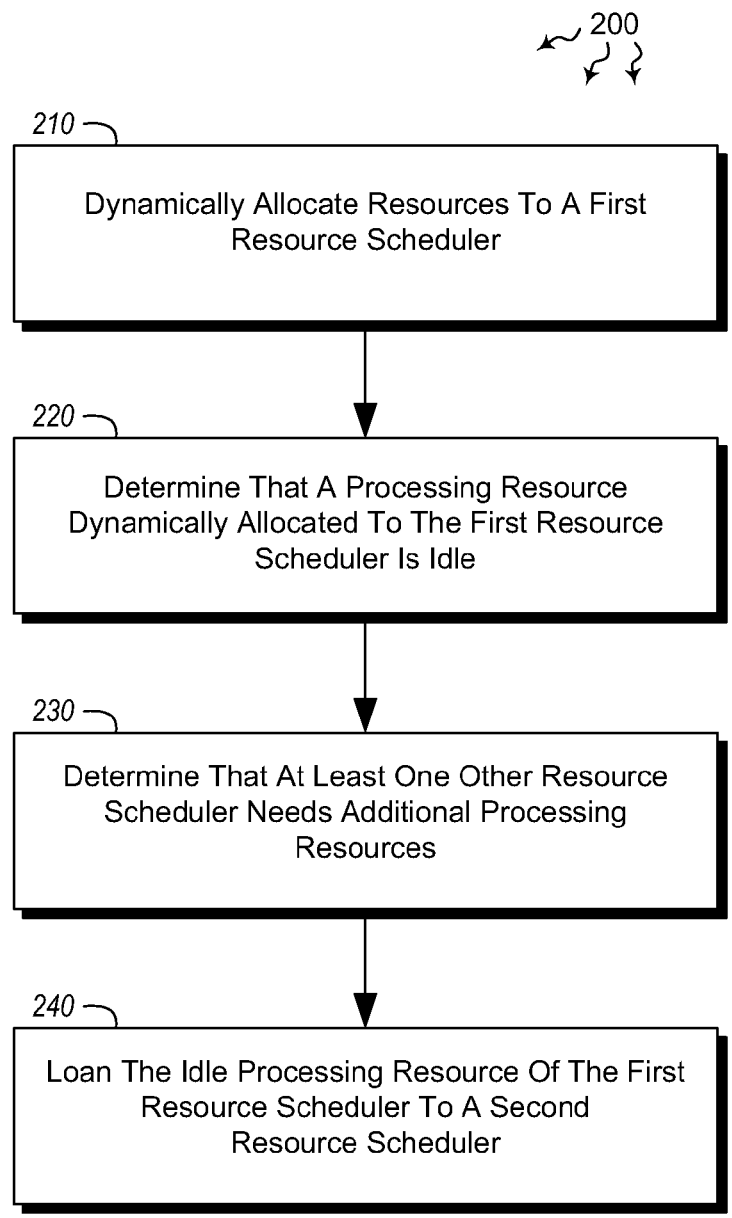
FIG. 2 illustrates a flowchart of an example method for dynamically allocating processing resources among a plurality of resource schedulers.

FIG. 2 illustrates a flowchart of a method 200 for dynamically allocating processing resources among a plurality of resource schedulers. The method 200 will now be described with frequent reference to the components and data of environment 100.

Method 200 includes an act of a resource manager dynamically allocating one or more resources to a first resource scheduler, wherein the resource manager is configured to dynamically allocate resources among a plurality of resource schedulers, and wherein each scheduler is configured to manage one or more processing resources (act 210). For example, resource allocation module 115 of resource manager 110 may dynamically allocate various processing resources 131A to scheduler A (130A). Resource manager 110 may be configured to dynamically allocate resources 131A/131B among multiple different resource schedulers including schedulers A & B. Each scheduler may be configured to individually manage each of its one or more assigned processing resources.

In some cases, a resource management policy may used to determine how processing resources are allocated. For instance, a user (105) may send a policy input (106) that is used by resource manager 110 to allocate processing resources among the various schedulers. Accordingly, resources may be added, removed or rebalanced based on a user-defined policy. Such policy decisions may include a preference or importance rating for certain tasks indicating that they have a higher processing priority than other tasks. Other policy decisions may include how to spread load between processors, between computer systems, between schedulers or between individual processing resources. Still other policy indications may include the designation of a time period indicating that a resource that has not been used by a scheduler for that time period is idle and should be revoked. Many other policy indications are also possible and the above examples should not be read as limiting those settings that can be determined by a policy.

Furthermore, the policy or policies may be dynamically altered during processing and those changes made to the policy/policies may be implemented in real-time. Thus, resource scheduler policies are fully customizable by a scheduler user, a resource manager user or any other type of user that has appropriate access rights to implement policies.

Method 200 includes an act of the resource manager determining that at least one of the one or more processing resources dynamically allocated to the first resource scheduler is idle (act 220). For example, resource manager 110 may determine that processing resource 135A is idle. In some cases, this determination may be based on the occurrence of API calls monitored by the resource manager. These API calls indicate to the resource manager whether the schedulers are being used or not. Additionally or in alternative embodiments, the determination may be based on statistical information provided in usage data 145A/145B. In such cases, the statistical information may include an indication of how many processing tasks have been executed and how many processing tasks are left to be processed. The statistical information may be based on both current processing tasks and a prediction of future use.

Raw processing core usage data for each processing core may be analyzed and provided as statistical feedback. In addition, the resource scheduler(s) may be configured to provide task execution information that supplements the raw processing core usage data. In some cases, the usage data may include an indication to the resource manager of whether they are being used or whether they are idle using various application programming interface (API) calls. The occurrence of these API calls may be tracked at the resource manager. The resource manager 110 can then use these occurrences to determine whether a resource is idle or busy and how busy they are.

In some cases, schedulers are configured to report on their current processing status to the resource manager on a regular basis. However, in other cases, a user may choose to have the schedulers not report on their processing status. For instance, the schedulers may indicate that they will not participate in sharing processing resources. This may be due to policy indicating that a particular scheduler is processing high-priority data or due to an indication from a user that a scheduler is to be reserved for an upcoming task and is not to share resources. Users may also choose to allow a scheduler to opt out of providing statistical feedback.

Method 200 includes an act of the resource manager determining that at least one other resource scheduler needs (or could benefit from) additional processing resources (act 230). For example, resource manager 110 may determine that resource scheduler 130B needs (or could benefit from) additional processing resources via resource request 140. In some embodiments, this determination may be based on any of the following (or any combination thereof): the scheduler's associated policy requesting more resources than it currently has (e.g. via resource request 140), an indication that the scheduler's currently allocated resources are fully used, or statistical information that includes information about the scheduler's current (and evaluated future) resource requirements.

Method 200 includes an act of the resource manager loaning the determined idle processing resource of the first resource scheduler to a second resource scheduler (act 240). For example, resource manager 110 may loan idle resource 135A to scheduler 130B. In some cases, scheduler 130B will then use the loaned resource 135B until expiration of a certain time period or until the completion of a task. In other cases, the resource may be loaned indefinitely until its return is requested by the scheduler that loaned it (here, scheduler 130A).

In some embodiments, it may be useful to minimize the amount of time that any two schedulers share the same processing resource. Accordingly, in such cases, the resources are loaned only temporarily and only for as long as the borrower needs them. Resource manager may be configured to automatically revoke a resource loan upon subsequently determining that the loaned processing resource is needed at the loaner resource scheduler. In this case, the revoked processing resource is then managed or owned exclusively by the loaner resource scheduler (i.e. the borrowing resource manager loses managerial control/ownership of the revoked resource). The resource may be returned immediately or may be allowed to continue processing up to a processing transfer point (a point at which processing can be safely stopped and resumed) before the resource loan is revoked and returned to the loaner resource scheduler. Resource rebalancing will be discussed in greater detail below with regard to FIGS. 3 & 4.

Figure 3:
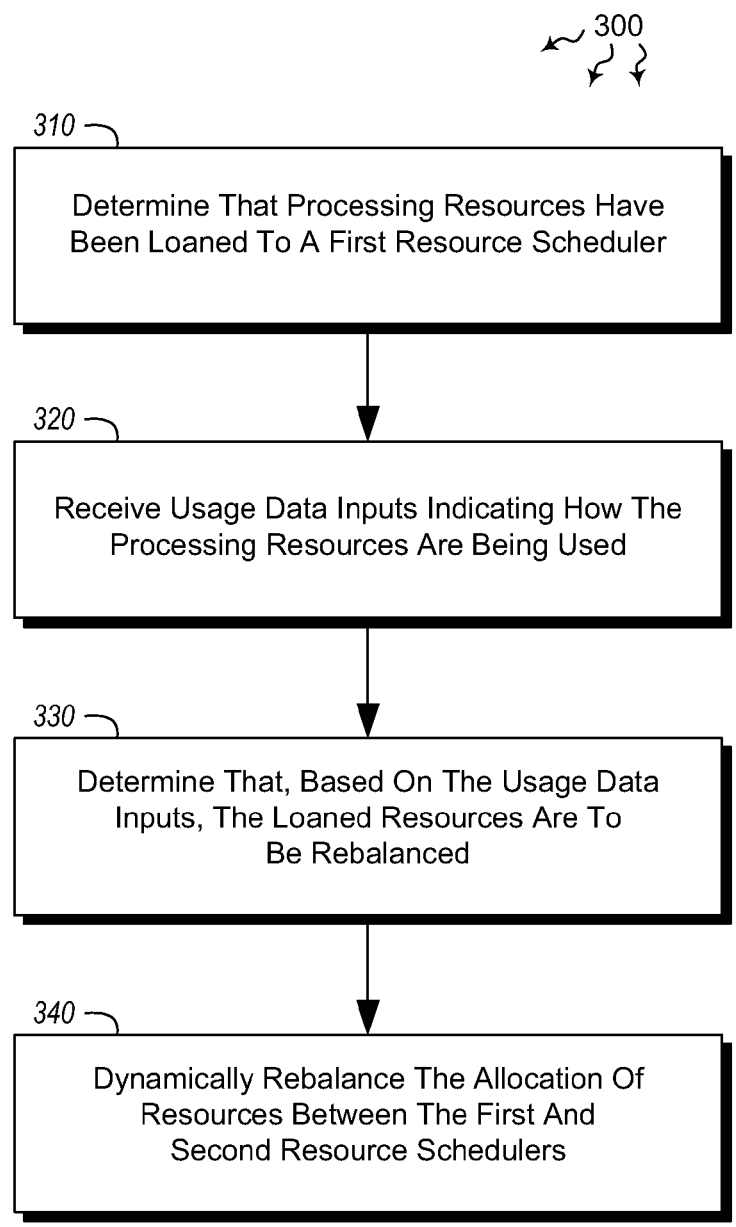
FIG. 3 illustrates a flowchart of an example method for dynamically rebalancing processing resources among a plurality of resource schedulers.
Figure 4:
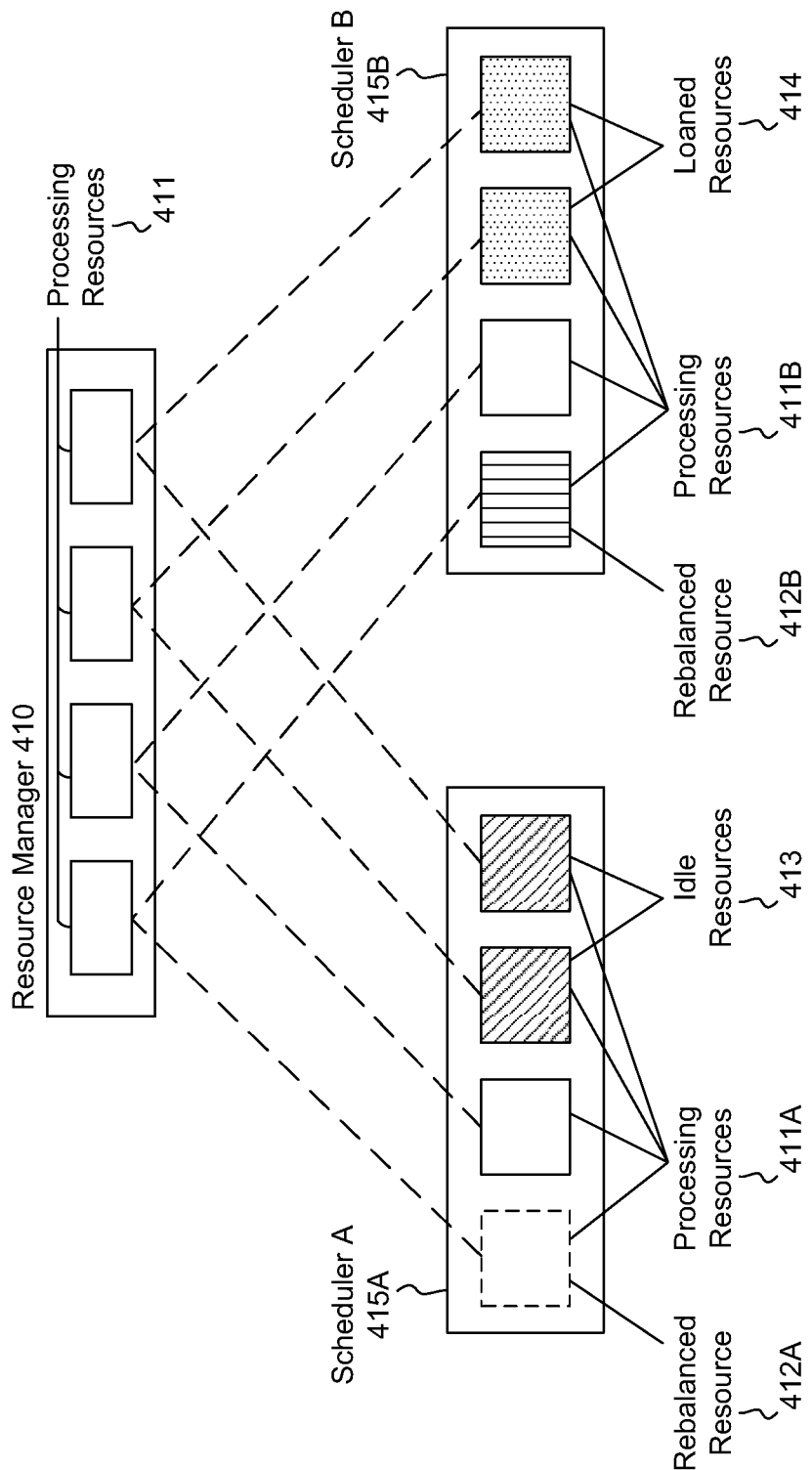
FIG. 4 illustrates an embodiment of the present invention in which a resource manager balances resources between schedulers.

FIG. 3 illustrates a flowchart of a method 300 for dynamically rebalancing processing resources among a plurality of resource schedulers. The method 300 will now be described with frequent reference to the components and data of environments 100 of FIGS. 1 and 400 of FIG. 4.

Method 300 includes an act of determining that one or more processing resources of a first resource scheduler have been loaned by a resource manager to at least a second resource scheduler (act 310). For example, a computer system (or resource manager 410) may determine that idle resources 413 of processing resources 411A of scheduler A (415A) have been loaned by resource manager 410 to scheduler B (415B). As explained above, many different resources may be loaned to many different schedulers, located perhaps on different computer systems in perhaps different computer networks. Thus, although each scheduler in FIG. 4 includes four processing resources, it will be understood that substantially any number of schedulers and/or processing resources may be used and managed by one or more resource managers.

Method 300 also includes an act of receiving at the resource manager one or more usage data inputs indicating how the processing resources of the first resource scheduler and of the second resource scheduler are being used (act 320). For example, resource manager 110/410 may receive usage data inputs 145A/145B indicating how processing resources 131A/411A of scheduler A (130A/415A) and/or processing resources 131B/411B of scheduler B (130B/415B) are being used. The usage data, as indicated above, may include the current and past usage of each processing resource and may include how much the processor was used over a given period of time in total, on an average, on a certain day or time, which tasks were processed, hardware information about the resources or any other type of resource usage data.

Method 300 includes an act of the resource manager determining that, based on the usage data inputs, the loaned resources are to be rebalanced, such that at least one of the first resource scheduler's loaned resources is to become part of the plurality of resources managed by the second resource scheduler (act 330). For example, resource manager 410 may determine that, based on the usage data inputs, that loaned resources 414 are to be rebalanced so that at least one of scheduler 415A's loaned resources becomes part of the processing resources 411B managed by scheduler 415B.

Accordingly, rebalanced resource 412A becomes rebalanced resource 412B which is part of scheduler B and is managed by scheduler B. Thus, resources that may have been idle and then loaned may become part of the resources managed by the borrowing scheduler. Resource rebalancing module 120 may later determine that the processing resources are to be rebalanced again and may determine where the resources are to be reallocated. Upon determining that a resource loan is to be changed, resource revoking module 125 may indicate to the respective borrower scheduler that its borrowed resource(s) is/are going to be removed and transferred back to the lender scheduler. In some embodiments, processing resources may be loaned and returned while waiting for a predetermined amount of usage data inputs to be received. In such cases, while the resource manager is waiting for the usage data inputs, resources can be loaned and borrowed to more efficiently process the tasks assigned to the various schedulers.

Method 300 includes an act of the resource manager dynamically rebalancing the allocation of resources between at least the first and second resource schedulers, such that at least one of the first resource scheduler's loaned resources becomes part of the plurality of resources managed by the second resource scheduler (act 340). For example, resource rebalancing module 120 of resource manager 110 may dynamically rebalance the allocation of resources between schedulers A & B. In one embodiment, resource 412A is rebalanced to scheduler B (as resource 412B) and can then be applied to tasks assigned to scheduler B. The rebalancing of resources may be performed continually and automatically at predetermined intervals. These intervals may be configured by the user (105) and/or by policy. Moreover, it should be noted that in some cases that involve multiple schedulers, resources can be loaned from one scheduler to another, and then from borrowing scheduler to another, different borrower scheduler, and so on. Accordingly, in such cases, resource rebalancing module 120 may be configured to rebalance resources over the plurality of different schedulers.

In this manner, idle processing resources may be loaned to other process schedulers. These resources may be loaned for as long as needed or until requested by the loaning scheduler. The continual monitoring of schedulers and processing resources allows resources to be rebalanced to different schedulers as needed to more efficiently process the tasks assigned to those schedulers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for dynamically allocating processing resources among a plurality of resource schedulers, the method comprising:

an act of a resource manager dynamically allocating one or more resources to a first resource scheduler, wherein the resource manager is configured to dynamically allocate resources among a plurality of resource schedulers, and wherein each scheduler is configured to manage one or more processing resources;

an act of the resource manager determining that at least one of the one or more processing resources dynamically allocated to the first resource scheduler is idle;

an act of the resource manager determining that at least one other resource scheduler needs additional processing resources; and an act of the resource manager loaning the determined idle processing resource of the first resource scheduler to a second resource scheduler, the loaned processing resource being controlled by both the first resource scheduler and the second resource scheduler, the first resource scheduler being enabled to immediately revoke the loaned processing resource directly from the second resource scheduler to process first resource scheduler tasks.

2. The method of claim 1, wherein determining that at least one of the one or more processing resources dynamically allocated to the first resource scheduler is idle is based on at least a portion of statistical information.

3. The method of claim 2, wherein the statistical information includes an indication of how many processing tasks have been executed and how many processing tasks are left to be processed.

4. The method of claim 1, further comprising minimizing the amount of time that any two schedulers share the same processing resource.

5. The method of claim 1, wherein at least one of the resource schedulers indicates that it will not participate in sharing processing resources.

6. The method of claim 1, wherein at least one of the resource schedulers indicates that it will not participate in providing statistical feedback.

7. The method of claim 6, wherein raw processing core usage data for each processing core is analyzed and provided as statistical feedback.

8. The method of claim 1, wherein each resource scheduler is configured to provides task execution information in addition to raw processing core usage data.

9. The method of claim 1, wherein the resource schedulers indicate to the resource manager whether they are being used or whether they are idle using API calls.

10. The method of claim 9, further comprising an act of tracking the occurrence of the API calls at the resource manager.

11. The method of claim 1, wherein resource scheduler policies are customizable by a scheduler user or a resource manager user.

12. The method of claim 11, wherein at least one of the resource scheduler policies includes a designation of a time period that, when expired, indicates that a resource is idle.

13. The method of claim 2, wherein the statistical information is based on both current processing tasks and a prediction of future use.

14. A computer program product for implementing a method for dynamically rebalancing processing resources among a plurality of resource schedulers, the computer program product comprising one or more physical computer-readable storage devices having stored thereon computer-executable instructions that, when executed by one or more processors of a computing system, cause the computing system to perform the method, the method comprising:

an act of determining that one or more processing resources of a first resource scheduler have been loaned by a resource manager to at least a second resource scheduler, such that the loaned processing resource is controlled by both the first resource scheduler and the second resource scheduler, and such that the first resource scheduler is enabled to immediately revoke the loaned processing resource directly from the second resource scheduler to process first resource scheduler tasks;

an act of receiving at the resource manager one or more usage data inputs indicating how the processing resources of the first resource scheduler and of the second resource scheduler are being used;

an act of the resource manager determining that, based on the usage data inputs, the loaned resources are to be rebalanced, such that at least one of the first resource scheduler's loaned resources is to become part of the plurality of resources managed by the second resource scheduler; and an act of the resource manager dynamically rebalancing the allocation of resources between at least the first and second resource schedulers, such that at least one of the first resource scheduler's loaned resources becomes part of the plurality of resources managed by the second resource scheduler and is controlled the second resource scheduler to the exclusion of the first resource scheduler.

15. The computer program product of claim 14, wherein the resource allocation rebalancing is performed continually at predetermined intervals.

16. The computer program product of claim 14, wherein processing resources are loaned and returned while waiting for a predetermined amount of usage data inputs to be received.

17. The computer program product of claim 14, further comprising an act of the second resource scheduler loaning the processing resource received during the rebalance to a third resource scheduler.

18. A computer system comprising the following:
one or more processors;
system memory;
one or more computer-readable storage media having stored thereon computer-executable instructions that, when executed by the one or more processors, causes the computing system to perform a method for dynamically allocating processing resources among a plurality of resource schedulers, the method comprising the following:
an act of a resource manager dynamically allocating one or more resources to a first resource scheduler, wherein the resource manager is configured to dynamically allocate resources among a plurality of resource schedulers, and wherein each scheduler is configured to manage one or more processing resources;
an act of the resource manager determining that at least one of the one or more processing resources dynamically allocated to the first resource scheduler is idle;
an act of the resource manager determining that at least one other resource scheduler needs additional processing resources;
an act of the resource manager loaning the determined idle processing resource of the first resource scheduler to a second resource scheduler, the loaned processing resource being managed by both the first resource scheduler and the second resource scheduler, the first resource scheduler being enabled to immediately revoke the loaned processing resource directly from the second resource scheduler;
an act of the first resource scheduler subsequently determining that the loaned processing resource is needed at the first resource scheduler; and
an act of the first resource scheduler revoking the resource loan, such that the loaned processing resource is managed exclusively by the first resource scheduler.

19. The system of claim 18, wherein the loaned resource is allowed to continue processing up to a processing transfer point before the resource loan is revoked.

20. The system of claim 18, wherein each processing resource is configured to report its current processing status to the resource manager.

* * * * *